United States Patent [19]

Jolly

[11] Patent Number: 4,580,708

[45] Date of Patent: Apr. 8, 1986

[54] MACHINE AND METHOD FOR RENDERING IRRADIATED NUCLEAR FUEL PINS INTO SHORT LENGTHS

[75] Inventor: Robert Jolly, Freckleton, England

[73] Assignee: United Kingdom Atomic Energy Authority, London, England

[21] Appl. No.: 537,507

[22] Filed: Sep. 30, 1983

[30] Foreign Application Priority Data

Oct. 11, 1982 [GB] United Kingdom ............... 8228972

[51] Int. Cl.⁴ ..................... B26D 3/08; B26F 3/00
[52] U.S. Cl. ............................................. 225/2; 225/4;
225/96.5; 225/98; 83/880; 83/885; 83/925 R;
29/400 N
[58] Field of Search ............... 225/2, 4, 96.5, 98,
225/99; 29/400 N; 83/879, 880, 884–887, 925 R

[56] References Cited

U.S. PATENT DOCUMENTS

| | | | |
|---|---|---|---|
| 167,794 | 9/1875 | Smith | 83/436 |
| 936,383 | 10/1909 | Thibodeau | 83/887 |
| 2,252,362 | 8/1941 | Carus | 225/98 |
| 2,704,520 | 3/1955 | Rose | 83/885 |
| 3,877,625 | 4/1975 | Brook | 225/2 |
| 4,076,159 | 2/1978 | Farragher | 225/96.5 |
| 4,226,352 | 10/1980 | Watson | 225/98 |
| 4,346,828 | 8/1982 | Crawley | 225/96.5 |

FOREIGN PATENT DOCUMENTS

1168853 10/1969 United Kingdom .
2070478 9/1981 United Kingdom .

Primary Examiner—James M. Meister
Assistant Examiner—John L. Knoble
Attorney, Agent, or Firm—William R. Hinds

[57] ABSTRACT

Irradiated nuclear fuel pins (30) comprising metal-sheathed refractory pellets are rendered into short lengths by notching at a pair of notching wheels (14) and providing a deflector block (18) against which the notching wheels drive the notched pins to bend and brake them at the notches.

3 Claims, 2 Drawing Figures

MACHINE AND METHOD FOR RENDERING IRRADIATED NUCLEAR FUEL PINS INTO SHORT LENGTHS

BACKGROUND OF THE INVENTION

This invention relates to rendering irradiated nuclear fuel pins of metal-sheathed refractory pellets into short lengths (typically 2 cms) so that they can be fed, in an acceptable form, to chemical dissolver apparatus.

The current practice for rendering fuel pins into short lengths (such as the fuel pins coming from irradiated fast reactor fuel elements) is to crop them using a shearing machine. The shearing action on a pin (which typically comprises a stainless steel sheath and refractory oxide fuel pellets) causes fairly rapid wear on the shearing blade and also tends to fold over the sheared sheath end so that, when the cropped length is subjected to dissolving liquids, the liquids are somewhat inhibited from reaching the fuel pellets.

The present invention avoids the above stated adverse feature in a compact machine.

FEATURES AND ASPECTS OF THE INVENTION

The present invention provides a method of rendering irradiated nuclear fuel pins of metal sheathed refractory pellets into short lengths comprising the step of notching the fuel pins followed by the step of bending the notched pins at their notching.

Preferably the action of notching the fuel pins also drives them against a deflector at which they are bent and broken.

Apparatus for carrying out the invention comprises an input guide for guiding the nuclear fuel pins individually into the machine; a feed wheel pair located to accept the fuel pins from the input guide; a notching wheel pair located to accept pins fed from the feed wheel pair; and a deflector block against which the notched pins are driven, bent and broken at the notching by a drive created by the notching wheel pair.

DESCRIPTION OF THE DRAWINGS

One form of apparatus according to the invention will now be described further with reference to the accompanying drawings in which.

DESCRIPTION OF THE PREFERRED EMBODIMENT

Figure 1:
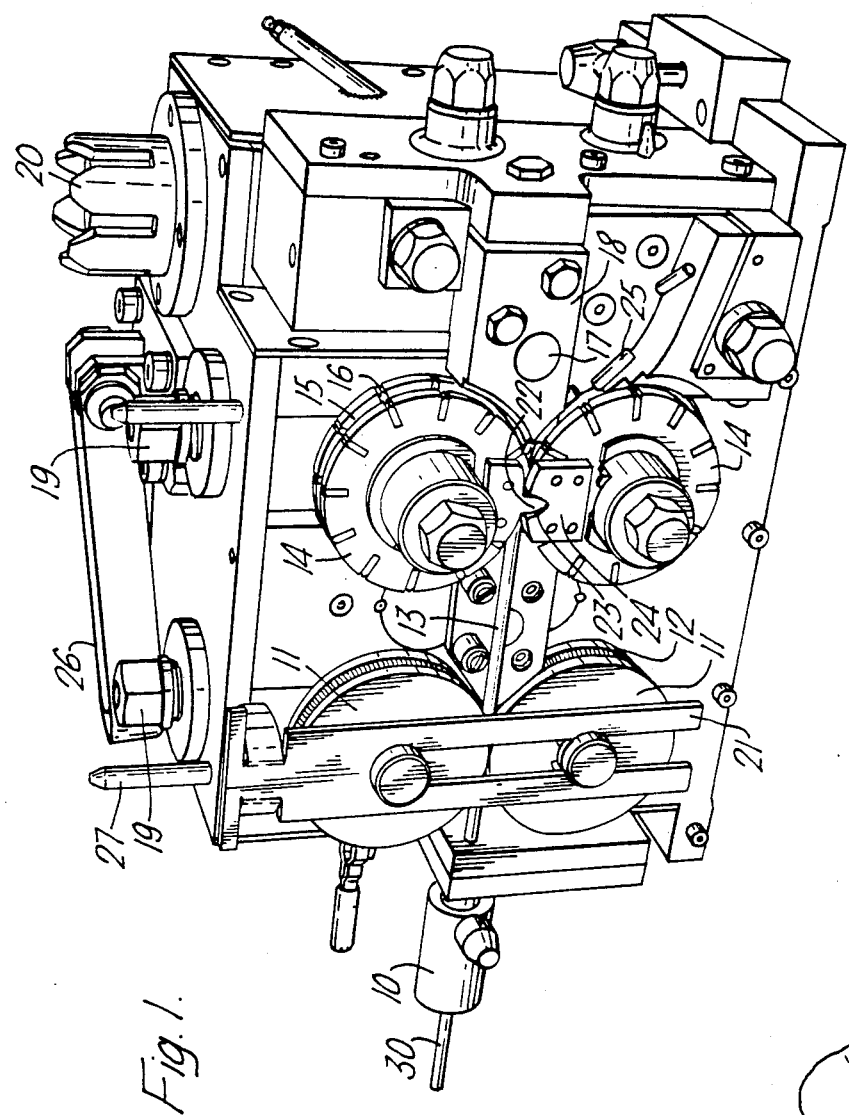
FIG. 1 is an oblique-overhead frontal view.

FIG. 1 shows an input guide block 10 along which nuclear fuel pins are guided individually to a feed station comprising a feed wheel pair 11, each wheel having a knurled semi-circular peripheral recess 12. At the exit to the wheel pair 11 there is a guide 13 which accepts pins as they leave the feed wheel pair, and provides a bridge to a pair of notching wheels 14 comprising similar upper and lower wheels each having a semi-circular peripheral recess 15 and uniformly spaced semi-circular notching inserts 16. On the exit side of the notching wheels there is a deflector wheel 17 set into a block 18, against which the notched pins are driven, bent and broken by the out-feed action of the notching wheels.

The upper wheels 11, 14 are spring loaded by springs (not shown) retained under adjusting nuts 19. The springs allow the wheel pairs to accept fuel pins which have swollen irregularly during irradiation. An input drive coupling 20 is shown which connects with a worm and worm wheel drive for the wheels 11, 14. A wheel retainer fork 21 is also shown. The upper wheel 14 has an alignment tooth 22 which can engage each revolution in a recess 23 in a plate 24 on the lower wheel 14 to ensure that the notching inserts 16 in both wheels are truly aligned. Short lengths 25 of fuel pin broken from a full length fuel pin are shown. The apparatus is shown with a hoisting handle 26 and locating pins 27 for a front cover (not shown) to retain any dust.

Figure 2:
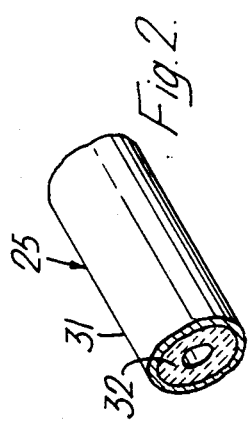
FIG. 2 is a perspective view of a short length of notched and broken fuel pin.

In FIG. 2 a typical short length 25 is shown. This consists of a sheath 31 and oxide fuel pellets 32 inside the sheath.

I claim:

1. In a method of rendering irradiated nuclear fuel pins of metal sheathed refractory pellets into short lengths comprising the step of notching the fuel pins, the improvement comprising notching the pins by a pair of opposed driven notching wheels having notching members spaced thereabout by feeding the pins thereto and driving the notched pins therefrom, maintaining alignment of the driven notching wheels by using non-driving coacting alignment members on the wheels to periodically coact and ensure alignment, and breaking the notched pins by using the out-feed action of the notching wheels to drive the notched pins against a static deflector disposed at an angle to the outfeed path so as to bend and break the pins at the notches.

2. A machine for rendering irradiated nuclear fuel pins of metal sheathed refractory pellets into short lengths comprising an input guide (10) for guiding the nuclear fuel pins (30) individually into the machine; a feed wheel pair (11) located to accept the fuel pins from the input guide; an opposed notching wheel pair (14) having notching members spaced thereabout and located to accept pins fed from the feed wheel pair; means for driving said notching wheels; means for maintaining alignment of the driven notching wheels comprising non-driving coacting alignment members on the wheels to periodically coact and ensure alignment; and a deflector block (18) against which the notched pins are driven, bent and broken by the out-feed action of the notching wheel pair.

3. A machine as claimed in claim 2 in which both the feed wheel pair and the notching wheel pair have a knurled semi-circular peripheral recess (12, 15) for accepting the fuel pins and one wheel of each pair is adjustably spring loaded to allow passage of fuel pins which have swollen during irradiation.

* * * * *